US009333920B2

(12) United States Patent
Skapof et al.

(10) Patent No.: US 9,333,920 B2
(45) Date of Patent: May 10, 2016

(54) SLIDING AND REMOVABLE CUP HOLDER ASSEMBLY FOR VEHICLE

(71) Applicant: Honda Motor Co., Ltd., Tokyo (JP)

(72) Inventors: Robert A. Skapof, Dublin, OH (US); Albert Pankrac Chmelar, Marysville, OH (US); Anthony J. Arcuri, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/526,606

(22) Filed: Oct. 29, 2014

(65) Prior Publication Data

US 2015/0353019 A1 Dec. 10, 2015

Related U.S. Application Data

(63) Continuation-in-part of application No. 14/299,043, filed on Jun. 9, 2014.

(51) Int. Cl.
| | |
|---|---|
| *B60N 3/10* | (2006.01) |
| *B60R 7/04* | (2006.01) |
| *B60N 2/46* | (2006.01) |
| *B60R 11/00* | (2006.01) |

(52) U.S. Cl.
CPC ................ *B60R 7/04* (2013.01); *B60N 2/4686* (2013.01); *B60N 3/10* (2013.01); *B60N 3/102* (2013.01); *B60N 3/103* (2013.01); *B60R 2011/0007* (2013.01)

(58) Field of Classification Search
CPC ............. B60R 7/04; B60R 2011/0007; B60N 3/105–3/106; B60N 3/108; B60N 3/083; B60N 3/102–3/103; B60N 2/4686; B60N 3/10
See application file for complete search history.

(56) References Cited

U.S. PATENT DOCUMENTS

| | | | |
|---|---|---|---|
| 5,316,368 A | 5/1994 | Arbisi | |
| 5,718,405 A * | 2/1998 | Adachi | B60N 3/108 224/926 |
| 6,196,434 B1 | 3/2001 | Angran et al. | |
| 6,435,587 B1 | 8/2002 | Flowerday et al. | |
| 6,616,206 B2 | 9/2003 | Luginbill et al. | |
| 6,644,526 B2 | 11/2003 | Pegorier | |
| 6,854,779 B2 | 2/2005 | Gehring et al. | |

(Continued)

FOREIGN PATENT DOCUMENTS

| | | |
|---|---|---|
| DE | 19854245 | 5/2000 |
| EP | 1048514 | 11/2000 |

(Continued)

OTHER PUBLICATIONS

Website: http://www.carid.com/dorman/cup-holder.html, "Dorman®—Cup Holder", printed Aug. 26, 2014.

(Continued)

*Primary Examiner* — Jeanette E Chapman
(74) *Attorney, Agent, or Firm* — Rankin, Hill & Clark LLP

(57) ABSTRACT

A cup holder assembly for use in a console structure in a vehicle includes a cup holder for slidably and removably mounting within the console structure. The cup holder includes a cup holder body defining at least one cup holder recess. A guide is secured to the cup holder body for being removably received in the console structure. A finger recess portion connected to the guide defines a finger recess for manipulating at least one of the guide or the cup holder.

18 Claims, 5 Drawing Sheets

(56) References Cited

U.S. PATENT DOCUMENTS

| | | | |
|---|---|---|---|
| 7,168,669 B2* | 1/2007 | Park | B60N 3/106 224/539 |
| 7,258,381 B2* | 8/2007 | Sturt | E05B 83/32 296/24.34 |
| 7,322,500 B2 | 1/2008 | Maierholzner | |
| 7,341,297 B2* | 3/2008 | Nakamura | B60N 3/083 224/926 |
| 7,344,056 B2 | 3/2008 | Shelmon et al. | |
| 7,407,210 B2 | 8/2008 | Arbaugh et al. | |
| 7,413,229 B2 | 8/2008 | Kukucka et al. | |
| 7,416,235 B2 | 8/2008 | Rajappa et al. | |
| 7,434,859 B2 | 10/2008 | Mulvihill | |
| 7,530,615 B2 | 5/2009 | Ogura | |
| 7,543,874 B2 | 6/2009 | Ogura et al. | |
| 7,566,040 B2 | 7/2009 | Lota | |
| 7,581,774 B2 | 9/2009 | Abro et al. | |
| 7,731,254 B2* | 6/2010 | Lota | B60R 7/04 248/311.2 |
| 7,766,408 B2* | 8/2010 | Lota | B60N 2/4606 296/24.34 |
| 7,770,953 B2* | 8/2010 | Koarai | B60N 2/4606 296/24.34 |
| 7,784,843 B2* | 8/2010 | Lota | B60N 2/4686 296/24.34 |
| 7,810,969 B2 | 10/2010 | Blackmore et al. | |
| 8,056,754 B2* | 11/2011 | Stoner | B60N 3/106 220/529 |
| 8,246,097 B2 | 8/2012 | Beyer | |
| 8,276,964 B2 | 10/2012 | Werner et al. | |
| 8,480,151 B2* | 7/2013 | Gaudig | B60N 3/105 296/24.34 |
| 8,714,613 B1* | 5/2014 | Gillis | B60R 7/04 296/24.34 |
| 8,919,625 B1 | 12/2014 | Pope | |
| 2002/0089203 A1* | 7/2002 | Flowerday | B60N 3/08 296/37.8 |
| 2003/0015883 A1 | 1/2003 | Boys | |
| 2003/0127877 A1 | 7/2003 | Luginbill et al. | |
| 2006/0060741 A1* | 3/2006 | Yanagita | B60N 3/106 248/311.2 |
| 2007/0075558 A1* | 4/2007 | Kim | B60N 2/4686 296/24.34 |

FOREIGN PATENT DOCUMENTS

| | | |
|---|---|---|
| JP | 550875 | 3/1993 |
| JP | 2507114 | 5/1996 |
| JP | 2002316572 | 10/2002 |

OTHER PUBLICATIONS

Website: http://www.amazon.com/gp/product/B0046DlJ1Y/ref=as_li_ss_tl?ie=UTF8&tag=everybenz20&linkCode=as2&camp=1789&creative=390957&creativeASIN=B0046DIJ1Y, "BMW Genuine E36 Cup Holder in Center Console", printed Aug. 26, 2014.

Office Action of U.S. Appl. No. 14/299,043 dated Aug. 25, 2015, 25 pages.

Office Action of U.S. Appl. No. 14/299,043 dated Jan. 25, 2016, 23 pages.

* cited by examiner

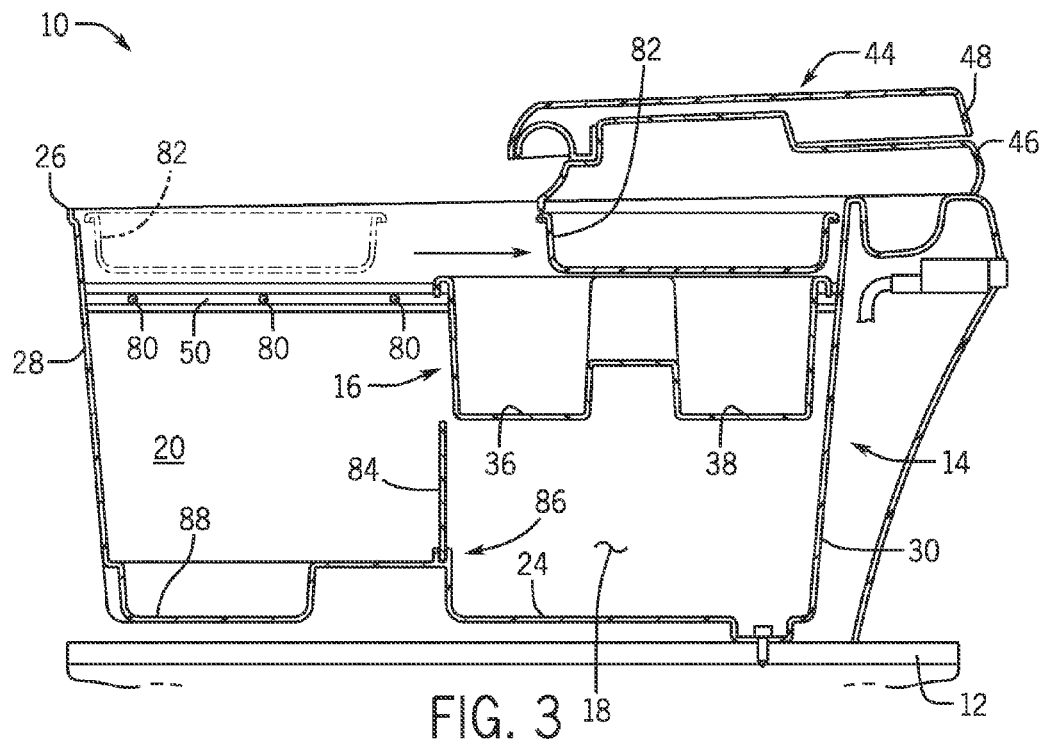
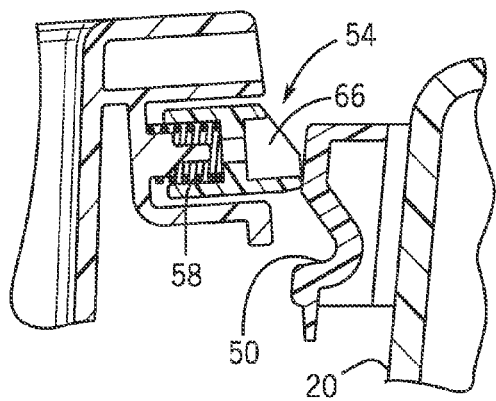
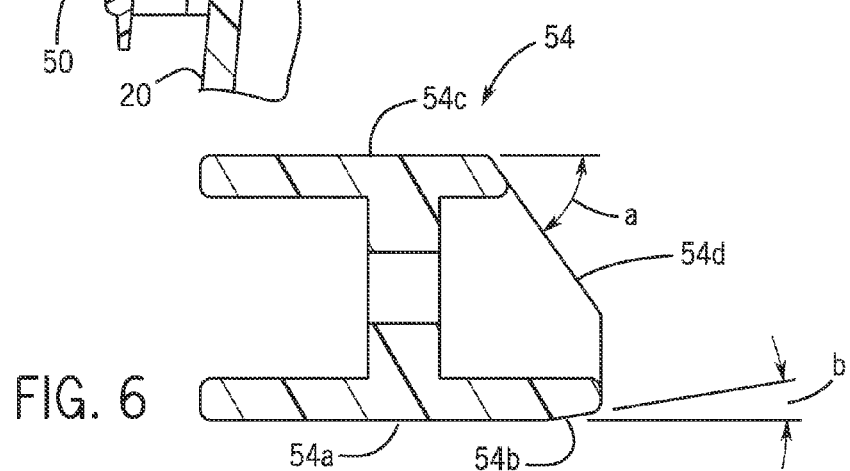

US 9,333,920 B2

SLIDING AND REMOVABLE CUP HOLDER ASSEMBLY FOR VEHICLE

CROSS-REFERENCE TO RELATED APPLICATIONS

This application is a continuation-in-part of U.S. patent application Ser. No. 14/299,043 filed on Jun. 9, 2014, the entirety of which is expressly incorporated herein by reference.

BACKGROUND

For a long time, vehicles have been provisioned with various types of cup holders to facilitate the driver and/or passenger carrying cups or other beverage containers in the vehicle. Generally, known vehicle cup holders come in two variations. One variation is a stationary/fixed cup holder that forces the driver or passengers to use the cup holder in a single position and makes any empty volume disposed under the cup holder unusable for storage. Another variation is a sliding cup holder that is moveable between a plurality of positions. Such sliding cup holders are generally not removable.

SUMMARY

According to one aspect, a cup holder assembly is provided for use in a console structure in a vehicle. The cup holder assembly includes a cup holder for slidably and removably mounting within the console structure. The cup holder includes a cup holder body defining at least one cup holder recess. A guide is secured to the cup holder body for being removably received in the console structure. A finger recess portion connected to the guide defines a finger recess for manipulating at least one of the guide or the cup holder.

According to another aspect, a cup holder assembly of a vehicle includes a cup holder slidably and removably disposed within a storage compartment of an associated console structure of the vehicle for sliding movement between a forward sliding position and a rearward sliding position. The cup holder includes a cup holder body and a combination button and guide secured to the cup holder body. The combination button and guide have an elongated guide portion and an actuator portion that enables at least one of the guide and the cup holder to be manipulated. The elongated guide portion extends at least along nearly an entire longitudinal length of the cup holder.

According to a further aspect, in a console assembly for a vehicle that defines a storage compartment with lateral walls thereof defining recessed tracks, a cup holder includes a cup holder body slidably and removably mounted to the console structure within the storage compartment. The cup holder body is slideable between a forward position disposed adjacent a front wall of the console structure and a rearward position disposed adjacent a rearward wall of the console structure. Guide portions of the cup holder body are removably received in the recessed tracks for guiding sliding movement of the cup holder between the forward position and the rearward position. A finger recess portion is integrally molded with one of the guide portions for manipulating said one of the guide portions or the cup holder body.

BRIEF DESCRIPTION OF THE DRAWINGS

FIG. 3 is a schematic cross-sectional view similar to FIGS. 1 and 2 but shown with a cup holder slidably moved to a rearward position within a surrounding console structure and shown with the arm rest member in a retracted position.

FIG. 5 is a partial cross-sectional view of a spring-biased guide of the cup holder similar to FIG. 4 but shown with the cup holder being installed in the console structure.

FIG. 6 is a partial enlarged view of the spring-biased guide of FIGS. 4 and 5.

DETAILED DESCRIPTION

Figure 1:
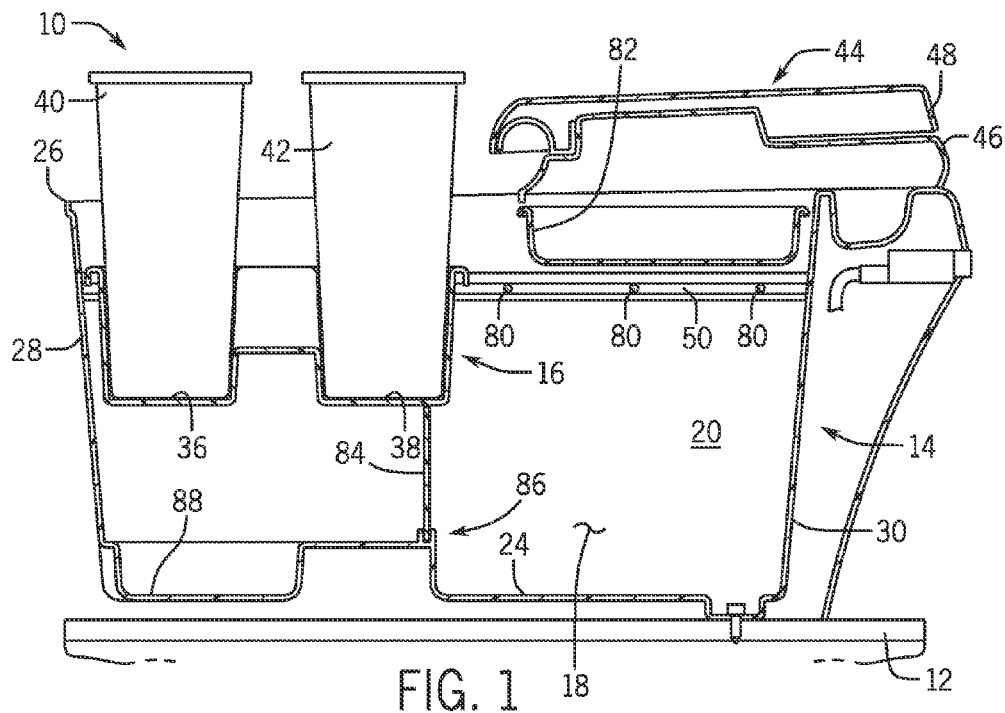
FIG. 1 is a schematic cross-sectional view of a shelfless sliding and removable cup holder assembly for a vehicle according to an exemplary embodiment.
Figure 2:
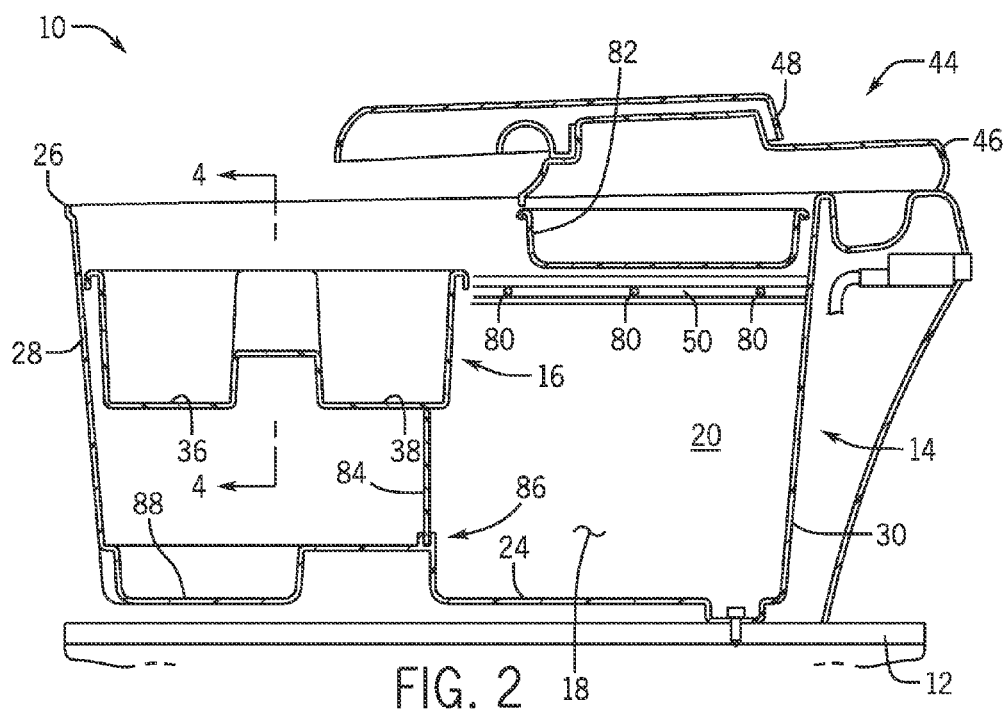
FIG. 2 is a schematic cross-sectional view similar to FIG. 1 but shown with cups or beverage containers removed from the cup holder assembly and shown with a sliding arm rest portion in an extended position.

Referring now to the drawings wherein the showings are for purposes of illustrating one or more exemplary embodiments and not for purposes of limiting the same, FIGS. 1-3 illustrates a sliding and removable cup holder assembly 10 for a vehicle 12 according to an exemplary embodiment. As shown, the cup holder assembly 10 includes a console structure 14 disposed within the vehicle 12 and a cup holder 16 slidably and removably mounted within the console structure 14. More particularly, the console structure 14 defines a storage compartment or bin 18 therein and the cup holder member 16 is slidably disposed within the storage compartment 18 of the console structure 14 for sliding movement between a forward sliding position (the position shown in FIGS. 1 and 2) and a rearward sliding position (the position shown in FIG. 3), and any position therebetween. In addition to being slidable within the console structure 14, and as will be described in further detail below, the cup holder 16 is readily removable from the console structure 14 to permit the storage compartment 18 to be used without the cup holder 16. Thus, the cup holder 16 is slidably and removably mounted to the console structure 14 within the storage compartment 18.

Figure 4:
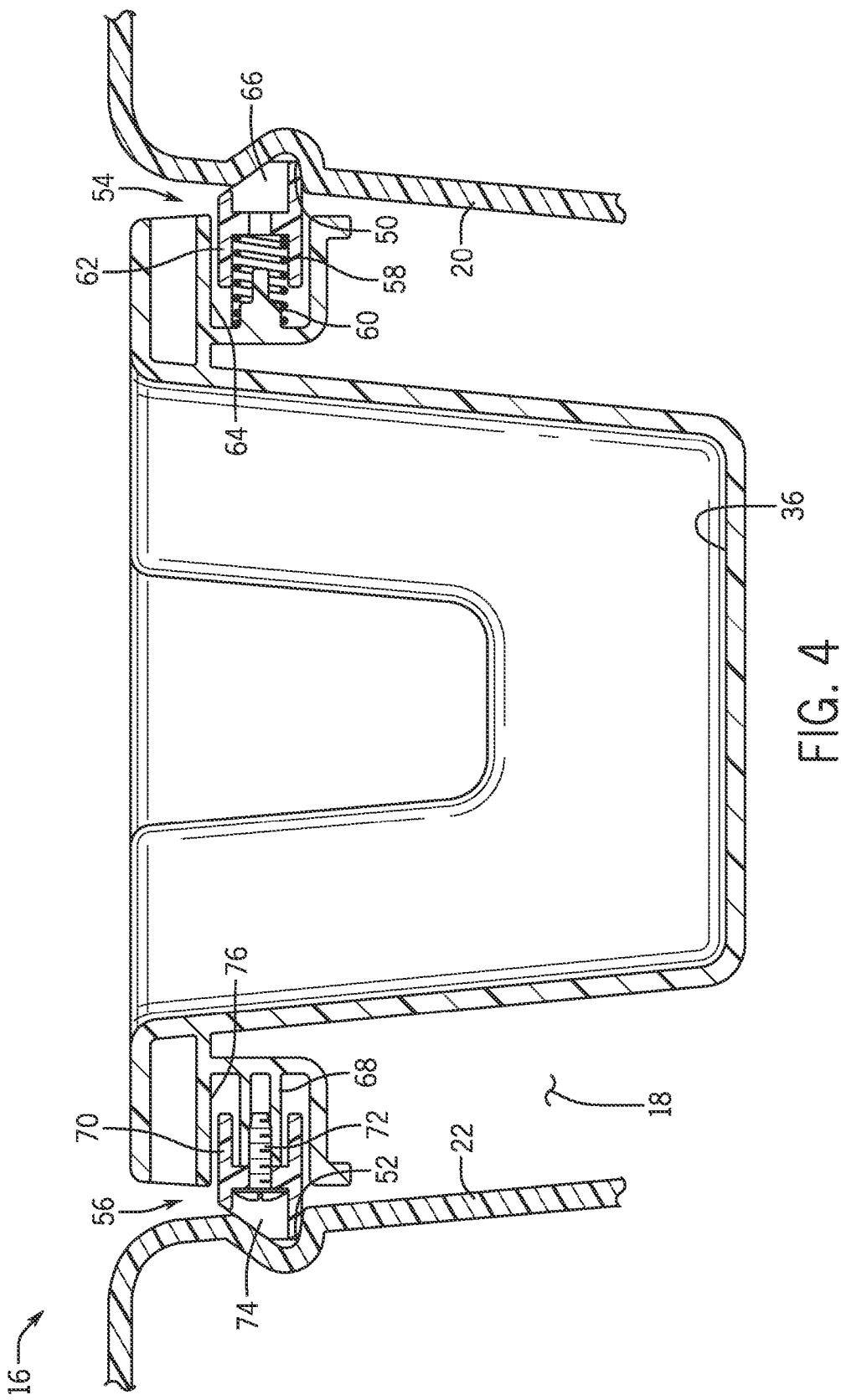
FIG. 4 is a cross-sectional view taken along the line 4-4 of FIG. 2.

With additional reference to FIG. 4, the storage compartment 18 is defined by laterally spaced apart walls 20, 22, including first lateral sidewall 20 and second lateral sidewall 22. The storage compartment 18 is also defined by a lower wall or floor 24. As shown with respect to the wall 20 in FIGS. 1-3, both the laterally spaced apart walls 20, 22 extend from a floor 24 of the storage compartment 18 to an upper extent of the storage compartment 18. In the illustrated embodiment, the upper extent is an open end or open upper side 26 of the console structure 14. The storage compartment 18 is further defined by longitudinally spaced apart walls 28, 30, including front wall 28 and rearward wall 30 Accordingly, the storage compartment 18 defined between the walls 20, 22, 28 and 30 has a generally rectangular configuration, though this is not required. The cup holder 16 is specifically mounted at a vertical location spaced apart from the floor 24 of the storage compartment 18. In operation, the cup holder 16 is slideable between the forward position shown in FIGS. 1 and 2 wherein the cup holder 16 is disposed adjacent the front wall 28 of the console structure 14 and a rearward position shown in FIG. 3 wherein the cup holder 16 is disposed adjacent the rearward wall 30 of the console structure 14. Of course, the cup holder 16 is also slideable to any intermediate position between the forward and rearward positions.

The cup holder 16 of the illustrated embodiment includes a planar wall portion 32 at an upper end thereof. In the illustrated embodiment, the planar wall portion 32 includes spaced apart walls 32a, 32b with support ribs 34 extending therebetween. This creates a relatively hollow planar wall portion 32 that is lightweight while having robust structural integrity. The cup holder 16 further includes at least two cup recesses 36, 38 extending downward from the planar wall portion 32 for accommodating associated cups or beverage containers 40, 42 therein. As shown, the at least two cup recesses 36, 38 can be spaced apart longitudinally in a direction parallel to a sliding direction for the cup holder 16.

The console structure 14 can additionally include a closure member 44 disposed over at least a portion of the open upper side 26 of the console structure 14. In the illustrated embodiment, the closure member 44 includes a base portion 46 that extends over at least a portion of the storage compartment 18 from the rearward wall 30 along the open end 26 of the console structure 14 and a slidable portion 48 that is slidable to an extended position (shown in FIG. 2) relative to the base portion 46. Optionally, the base portion 46 can be pivotally secured to the console structure 14 to enable pivotal opening of the closure member 44 relative to the console structure 14. The console structure 14 and the closure member 44 can be together referred to as a console assembly.

The cup holder 16 is slidably mounted to the first and second lateral sidewalls 20, 22 for sliding movement along the lateral sidewalls 20, 22. The console structure 14 defines at least one recessed track (e.g., recessed tracks 50, 52) along which the cup holder 16 is slidably movable. In the illustrated embodiment, recessed track 50 is defined in the first lateral sidewall 20 and the cup holder 16 includes a guide or guide portion 54 removably received in the recessed track 50 and slidably movable along the recessed track 50. Also in the illustrated embodiment, the recessed track 50 is a first recessed track and the guide 54 is a first guide received in the first recessed track 50. Recessed track 52 is a second recessed track defined in the second lateral sidewall 22 and the cup holder 16 can include a second guide or guide portion 56 removably received in the second recessed track 52 and slidably movable along the second recessed track 52. Together, in the illustrated embodiment, the laterally spaced apart walls 20, 22 define the recessed tracks 50, 52 therein for slidably mounting the cup holder 16.

By this arrangement, the recessed tracks 50, 52 are defined in the lateral walls 20, 22 of the console structure 14 and the guides or guide portions 54, 56 of the cup holder 16 are removably received in the recessed tracks 50, 52 for guiding sliding movement of the cup holder 16 between the forward position (shown in FIGS. 1 and 2) and the rearward position (shown in FIG. 3), and to any intermediate position. Advantageously, this provides a shelfless arrangement and the sliding and removable cup holder assembly 10 can be referred to as a shelfless sliding and removable cup holder assembly. More particularly, no shelf or shelf-like member protrudes into the storage compartment from the lateral sidewalls 20, 22 (or the walls 28, 30) for supporting the cup holder 16 avoiding the disadvantage of some prior art designs wherein shelf member project into the storage compartment reducing the amount of usable storage space.

The cup holder 16 can include at least one spring-biased guide received in one of the recessed tracks 50 or 52. In the illustrated embodiment, the guide 54 is a spring-biased guide that is shown received in and therefore slideable along the recessed track 50. This enables the cup holder to be removed from the console structure 14 as will be described in further detail below. Thus, the first guide 54 is a spring-biased guide that is urged laterally outwardly into the first recess track 50 as best shown in FIG. 4. In the illustrated embodiment, the second guide 56 is a fixed guide received in the other of the recessed tracks 50 or 52. As shown, the second guide 56 is shown received in and therefore slideable along the recessed track 52.

By this arrangement, the cup holder 16 can be reversible; thus, the spring-biased guide 54 could be instead received in the recessed track 52 and the fixed guide 56 could be instead received in the recessed track 50 as desired by a driver or passenger of the vehicle 12. Such reversibility may be desirable, for example, in instances where the cup holder recesses 36, 38 vary in size (e.g., recess 36 is a large recess and recess 38 is a small recess) to allow selective forward and rearward positioning of the recesses 36, 38 relative to one another. Also, it is to be appreciated by those skilled in the art that the guides could be reversed on the cup holder 16 in an alternate design so that the guide 56 is a spring-biased guide and the guide 54 is a fixed guide. As another variation, both guides 54, 56 could be spring-biased guides like the guide 54 in the illustrated embodiment.

Returning to the illustrated embodiment, the guide 54 (i.e., the spring-biased guide) can include a spring 58 that urges the guide 54 laterally outwardly into the recessed track 50. As shown in the illustrated embodiment, the spring 58 can be a coil spring received on a protruding portion 60 of the cup holder 16 with a movable portion 62 arranged in a recess 64 of the cup holder 16 annularly about the spring 58 so that the spring 58 urges the movable portion 62 laterally outwardly away from the protruding portion 60. The movable portion 62 can include a tapered engaging section 66 that is selectively and/or removably received within the corresponding recessed track 50. The tapered engaging section 66 has a particular shape that facilitates easy receipt of the guide 54 into the recessed track 50 when the cup holder 16 is installed or re-installed into the console structure 14.

In contrast, no spring is associated with the fixed guide 56. In the illustrated embodiment, the fixed guide 56 includes a protruding portion 68 with a guide portion 70 fixed thereto by a suitable fastener 72, such as a screw or bolt. The guide portion 70 can include the tapered engaging section 74 like the tapered engaging section 66 on the guide 54 that is received within the recessed track 52 to facilitate easy installation or reinstallation of the cup holder 16. Advantageously, the movable guide portion 62 and the fixed guide portion 70 can be the same or similar in construction so that these parts could be used interchangeably during assembly of the cup holder assembly 10, though this is not required. The distinguishing features between the guides 54, 56 include the spring 58 for provisioning the guide portion 62 as a movable guide portion and the fastener 72 for provisioning the guide portion 70 as a fixed guide portion. Also like the guide 54, the guide 56 can include the protruding portion 68 being disposed within a recess 76.

To remove the cup holder 16 from the console structure 14, the cup holder 16 is manually moved laterally toward the first lateral sidewall 20 of the console structure 14 against the urging of the spring 58 to compress the spring 58 and allow the fixed guide 56 to be removed from the recessed track 52. Once the fixed guide 56 is removed, the spring-biased guide 54 can be removed from the recessed track 50 and then the cup holder 16 removed from the console structure 14. To re-install the cup holder 16, and with particular reference to FIG. 5, the fixed guide 56 is first inserted and installed in the recessed track 52 and then the spring-biased guide 54 is inserted and installed in the recessed track 50 with the spring 58 again being compressed to enable the movable guide portion 62 to move down along the console structure 14, and particularly down along the lateral sidewall 20, and into the recessed track 50.

With additional reference to FIG. 6, one or both of the guides 54, 56 (only guide 54 shown in FIG. 6) can have a shape that allows for increased friction between the cup holder 16 and corresponding ones of the lateral sidewalls 20, 22. The shape can be particularly selected so as to significantly increase friction between the cup holder 16 and the sidewalls 20, 22 as the cup holder 16 carries more weight (e.g., when beverage containers 40, 42 are carried in the recesses 36, 38). In one embodiment, a lower side 54*a* of the guide 54 can have a chamfer 54*b* with an angle "b" that is less than 10 degrees relative to a horizontal axis to facilitate such increased friction as the cup holder 16 is loaded. In particular, the angle b can be less than 5 degrees and, for example, is shown being 3 degrees relative to a horizontal axis in the illustrated embodiment. An upper side 54*c* of the guide 54 can have a chamfer 54*d* with an angle "a" that is between about 50 to 70 degrees and, for example, is 55 degrees in the illustrated embodiment.

Optionally, the cup holder assembly 10 can include a sliding tray 82 mounted within the console structure 14 at a vertical location above the cup holder 16. The sliding tray 82 can be independently slidably movable relative to the cup holder 16. Accordingly, either or both the sliding tray 82 and the cup holder 16 can close the storage compartment 18 together with the closure member 44 (e.g., when the sliding portion 48 is in the extended position) when in a respective forward position. The cup holder assembly 10 can also optionally include a partition wall 84 extending upward from the lower wall 24 and positioned in spaced apart relation from each of the front wall 28 and the rearward wall 30. Though not shown, the partition wall 84 can extend laterally from the first lateral sidewall 20 to the second lateral sidewall 22. In the illustrated embodiment, the partition wall 84 is removable from the console structure 14 and is removably received within a grooved structure 86 defined along the lower wall 24. As shown the partition wall 84 can extend upward to a location wherein the partition wall mates with or is closely adjacent an underside of the cup holder 16 when the cup holder 16 is in the forward position.

Forward of the partition member 84, in the illustrated embodiment, the lower wall 24 defines a cup holder recess 88. More particularly, the cup holder recess 88 can be defined by a raised portion 24*a* of the lower wall 24 on which the grooved structure 88 can be disposed. The cup holder recess 88 can be sized for accommodating larger beverage containers (e.g., a water bottle or large beverage cup too large to fit in the cup holder recesses 36, 38, not shown), though this is not required.

The console structure 14 can be constructed in one of various construction methods. For example, the console structure 14 could be constructed as a one-piece mold wherein the recessed tracks 50, 52 are integrally formed with the lateral sidewalls 20, 22. Alternatively, the recessed tracks 50, 52 could be formed in separate components and these separate components could be attached to the console structure (e.g., within apertures defined in the sidewalls 20, 22 of the console structure or as separate wall portions that attach to the console structure 14). As another example, the console structure could be molded as two halves (or as more than two components) and the halves joined together during assembly. Generally, any suitable construction method could be used to form the console structure 14.

An additional feature of the cup holder assembly 10 of the illustrated embodiment is the provision of a plurality of detents 80 disposed along at least one of the first and second recessed tracks 50, 52 for locking in a longitudinal position of the cup holder 16 relative to the console structure 14. In the illustrated embodiment, only the recessed track 50 is shown having the longitudinally spaced apart detents defining positions for the cup holder 16, but it is to be appreciated that matching detents could be provided along the recessed track 52, if desired. In any case, receipt of the guides 54 and/or 56 within the detents 80 inhibits sliding movement of the cup holder 16 relative to the console structure 14. In particular, this inhibition of movement can be sufficient to prevent or reduce the likelihood of the cup holder 16 slidably moving relative to the console structure 13 inadvertently, such as during acceleration of the vehicle 12, but still enables manual movement of the cup holder 16 relative to the console structure 14 when a sufficient manual force is applied thereto. The detents 80 are optional and the cup holder assembly 10 could exclude them.

Figure 7:
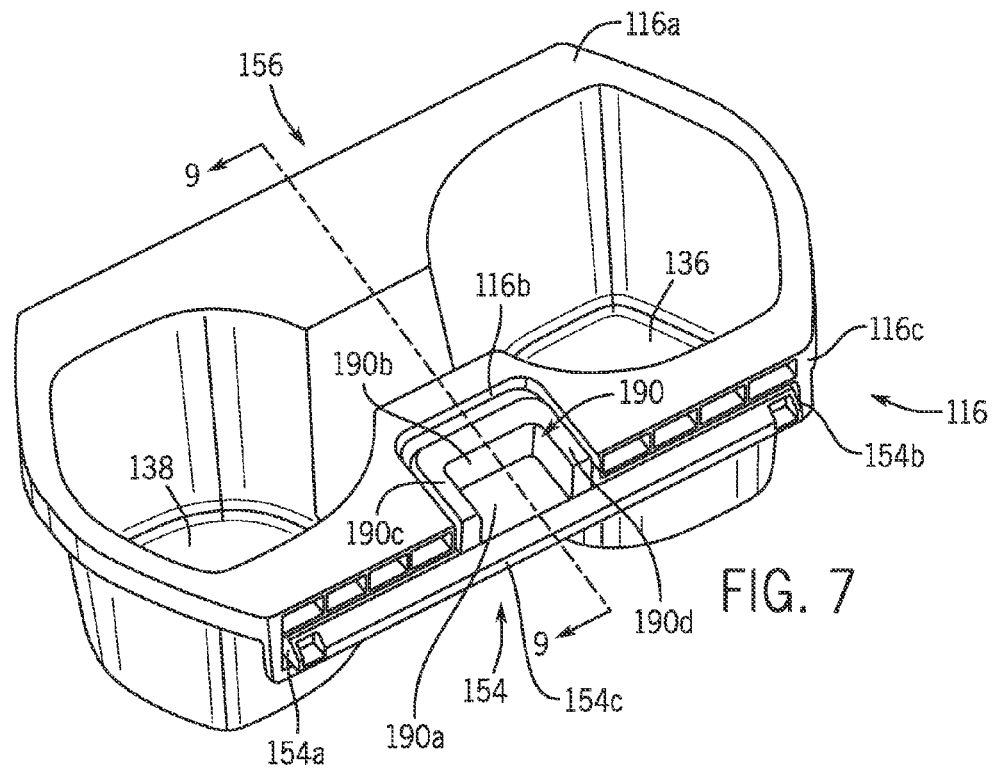
FIG. 7 is a perspective view of a cup holder according to an alternate exemplary embodiment.
Figure 8:
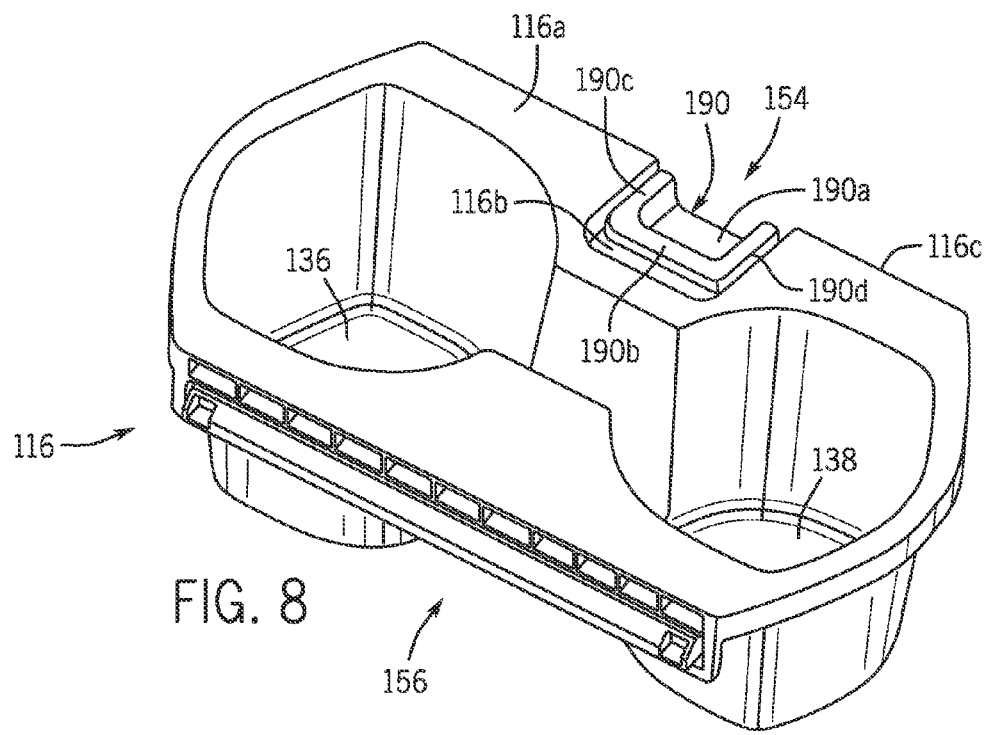
FIG. 8 is another perspective view of the cup holder of FIG. 7.

With reference to FIGS. 7 and 8, a cup holder 116 is shown according to an alternate embodiment. As will be appreciated and understood by those skilled in the art, the cup holder 116 can be substituted for the cup holder 16 in the cup holder assembly 10 described hereinabove. Thus, the cup holder assembly 10 can include the console structure 14 together with the cup holder 116 slidably and removably mounted within the console structure 14. The cup holder assembly 10 with the cup holder 116 can be provided for use in the console structure 14 in the vehicle 12. Except as described below, the cup holder 116 can be the same and/or function the same as the cup holder 16 in most respects.

More particularly, the cup holder 116 includes a cup holder body 116*a* defining at least one cup holder recess, a guide or guide portion 154 secured to the cup holder body 116*a* for being removably received in the console structure 14 and a finger recess portion 190 (also referred to herein as an actuator portion) connected to the guide 154. As shown, the guide 154 and the finger recess portion 190 can be integrally formed as an integrally molded component that is movably secured to the cup holder body 116*a* for lateral movement relative to the cup holder body 116*a*. The integrally molded component can be referred to as a combination button and guide.

Figure 9:
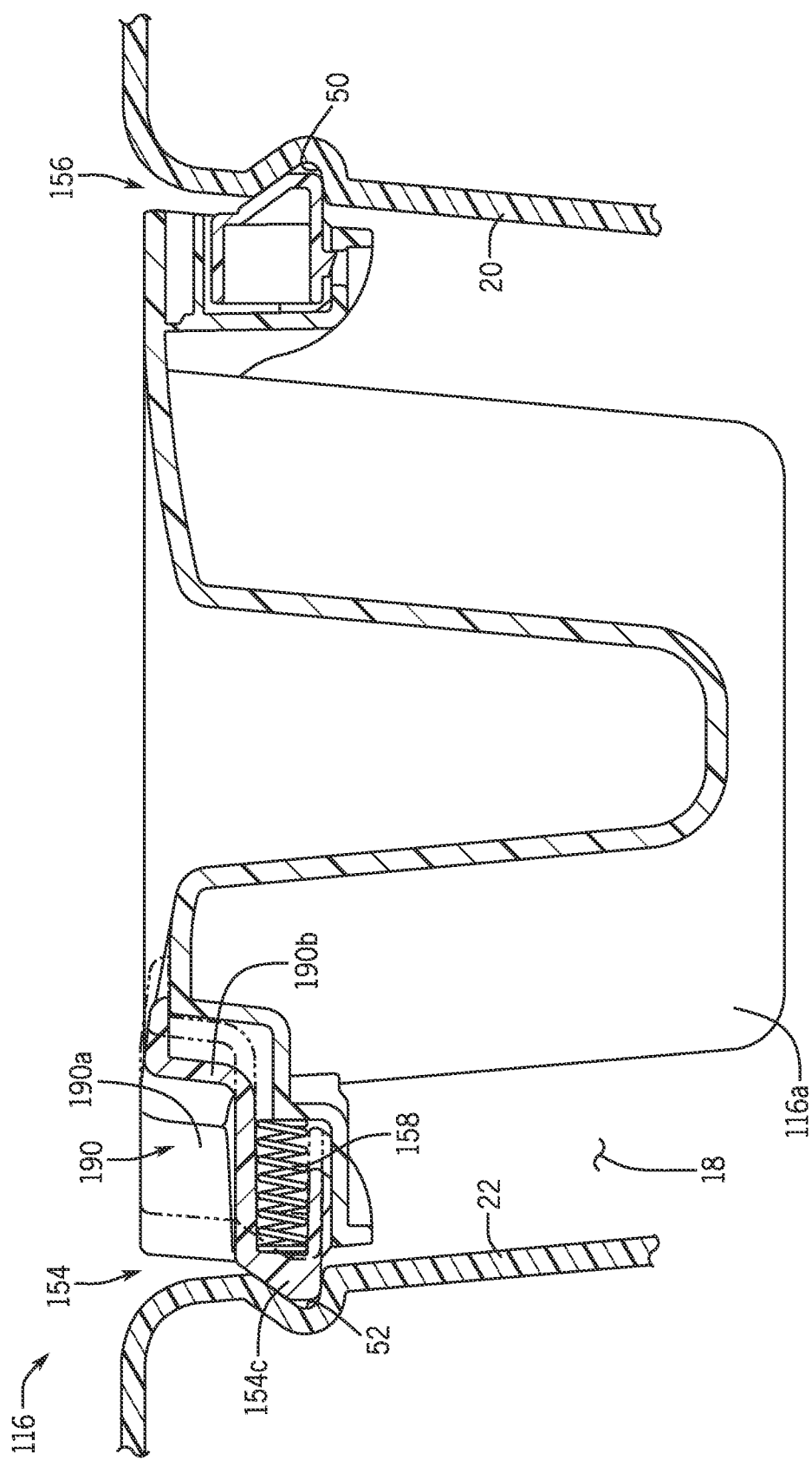
FIG. 9 is a cross-sectional view taken along the line 9-9 of FIG. 7.

The guide 154 can be a spring-loaded guide that functions similar to the guide 54. In particular, the guide 154 is removably received or receivable in one of the recessed tracks (e.g., recessed track 52, as shown in FIG. 9) and is slidably movable along the recessed track in which the guide 154 is received. As shown, the finger recess portion 190 is integrally formed with the guide 154 and defines a finger recess 190*a* for manipulating at least one of the guide 154 or the cup holder 116. For example, a user can insert a finger into the finger recess 190*a* for moving the guide 154, such as when compressing the guide 154 against a spring 158 thereof. In addition or in the alternative, a user can insert a finger into the finger recess 190*a* for moving the cup holder 116, such as when slidably moving the cup holder 116 relative to the console structure 14. In the embodiment illustrated, the at least one cup holder recess can be at least two cup holder recesses 136, 138 and the cup holder body can define a side wall 137 between the at least two cup holder recesses 136, 138. As shown, the finger recess 190*a* is positioned opposite the side wall 137 so that opposing forces can be applied to the finger recess 190*a* and the side wall 137 to facilitate manipulation of the cup holder.

As shown in FIG. 9, the lateral side wall 22 can be the first lateral side wall, the recessed track 52 defined in the lateral side wall 22 can be the first recessed track and the guide 154 can be the first guide (and the spring-biased guide) received in the first recessed track 52. Likewise, the lateral side wall 20 can be the second lateral wall and the recessed track 50 defined in the lateral side wall 20 can be the second recessed track. The cup holder 116 can further include a guide or guide portion 156 secured to the cup holder body 116a. The guide 156 can be a fixed guide that is fixed (i.e., not movable relative to) the cup holder body 116 and can function similar to the guide 56. In the illustrated embodiment, the guide 156 is a second guide that is removably received in the second recessed track 150 and slidably movable along the second recessed track 150.

In the embodiment illustrated in FIGS. 7-9, the first guide 154 is a spring-biased guide that is movably secured to the cup holder body 116a. The first guide 154 includes the spring 158 and is urged laterally outwardly into the first recessed track 52 by the spring 158 as shown in FIG. 9. Unlike the cup holder 16, the cup holder 116 includes the finger recess portion 190 integrally molded with the first guide 154 that is configured to receive a manual force (e.g., from a vehicle occupant) applied thereagainst sufficient to overcome the urging of the spring 158 to move the first guide 154 laterally inwardly compressing the spring 158 and out of the first recessed track 52 for removing the cup holder 116 from the console structure 14.

Also unlike the cup holder 16, the guides 154 and 156 on the cup holder 116 can be elongated guides so as to each be coextensive or nearly coextensive with a longitudinal length of the cup holder body 116a. For example, the guides 154, 156 can extend at least along nearly an entire longitudinal length of the cup holder 116, as is shown in FIGS. 7 and 8. More particularly, in the illustrated embodiment, each of the guides 154 and 156 is shown as extending along nearly an entire longitudinal length of the cup holder 116, and particularly the cup holder body 116a. In alternate embodiments, not shown, only one or the other of the guides 154, 156 can extend at least along nearly an entire longitudinal length of the cup holder. For example, the guides 154, 156 can extend along greater than 80-90% of the entire longitudinal length of the cup holder 116 and/or can extend along greater than 90-95% of a longitudinal length of the cup holder as disposed at the location of the guides 154, 156 (i.e., along the lateral side of the cup holder 116). In further alternate embodiments, the guides 154, 156 can be elongated but to a lesser extent than shown in the illustrated embodiment and/or described hereinabove.

As shown, the finger recess portion 190 can be disposed at or near a center of the guide 154 and spaced apart from longitudinal ends 154a, 154b of the guide 154, though this is not required. The finger recess portion 190 can include a lateral wall 190b spaced apart from the guide 154, and more particularly from a distal edge 154c of the guide 154, against which manual force is applied when a user's finger is received in the finger recess 190a to remove the guide 154 from the recessed track 52. The finger recess portion 190 can also include spaced apart longitudinal walls 190c, 190d extending laterally from the lateral wall 190b toward the guide 154, and particularly the distal edge 154c of the guide 154. Manual force (e.g., from a user's finger) can be applied to the longitudinal walls 190c, 190d to slidably move the cup holder body 116a relative to the console structure 14. The finger recess portion 190 is accommodated or received within a lateral recess 116b defined in a lateral side 116c of the cup holder body 116a. Advantageously, the finger recess portion 190 is provided so that there are no protruding shapes extending from the cup holder 116 that would increase the size or footprint of the cup holder 116 or create a poor appearance. Additionally, the finger recess portion 190 provides a visual cue to vehicle occupants that the cup holder 116 is removable without the need for signage or other indicia.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A cup holder assembly for use in a console structure in a vehicle, the cup holder assembly comprising:
a cup holder for slidably and removably mounting within the console structure, the cup holder including a cup holder body defining at least one cup holder recess;
a guide secured to the cup holder body for being removably received in the console structure; and
a finger recess portion connected to the guide defining a finger recess for manipulating at least one of the guide or the cup holder, the finger recess portion arranged such that the finger recess portion is moved to completely remove the guide from the console structure when removing the cup holder assembly.

2. The cup holder assembly of claim 1 wherein the at least one cup holder recess is at least two cup holder recesses and the cup holder body defines a side wall between the at least two cup holder recesses, and further wherein the finger recess is positioned opposite the side wall so that opposing forces can be applied to the finger recess and the side wall to facilitate manipulation of the cup holder.

3. The cup holder assembly of claim 1 wherein the console structure includes first and second lateral side walls defining a storage bin therebetween, the first lateral side wall defines a recessed track, the guide is removably received in the recessed track and slidably movable along the recessed track.

4. The assembly of claim 3 wherein the recessed track is a first recessed track and the guide is a first guide received in the first recessed track, and wherein a second recessed track is defined in the second lateral side wall and the cup holder includes a second guide secured to the cup holder body, the second guide removably received in the second recessed track and slidably movable along the second recessed track.

5. The assembly of claim 4 wherein the first guide is a spring-biased guide that is movably secured to the cup holder body, the first guide urged laterally outwardly into the first recessed track, and wherein the finger recess portion is configured to receive a manual force applied thereagainst sufficient to overcome said urging to move the first guide laterally inwardly and out of the first recessed track for removing the cup holder.

6. The assembly of claim 5 wherein the second guide is fixed to the cup holder body.

7. The assembly of claim 6 wherein at least one of the first guide and the second guide extends at least along nearly an entire longitudinal length of the cup holder.

8. The assembly of claim 1 wherein the guide and the finger recess portion are integrally formed, and further wherein the guide includes a spring urging the guide laterally outwardly, the cup holder removable from the console structure by applying a manual force via the finger recess to compress the guide against the spring.

9. The assembly of claim 1 wherein the guide is an elongated guide that extends at least along nearly an entire longitudinal length of the cup holder.

10. The assembly of claim 9 wherein the finger recessed portion is disposed at or near a center of the elongated guide and spaced apart from longitudinal ends of the elongated guide.

11. The assembly of claim 1 wherein the finger recessed portion includes a lateral wall spaced apart from the guide against which manual force is applied to remove the guide from the recessed track.

12. The assembly of claim 11 wherein the finger recessed portion includes spaced apart longitudinal walls extending laterally from the lateral wall toward the guide, manual force is applied to the longitudinal walls to slidably move the cup holder body relative to the console structure.

13. The assembly of claim 1 wherein the finger recess portion is accommodated within a lateral recess defined in a lateral side of the cup holder body.

14. A cup holder assembly of a vehicle, comprising:
a cup holder slidably and removably disposed within a storage compartment of an associated console structure of the vehicle for sliding movement between a forward sliding position and a rearward sliding position, the cup holder including a cup holder body and a combination button and guide secured to the cup holder body, the combination button and guide having an elongated guide portion and a button portion that enables at least one of the guide and the cup holder to be manipulated, the elongated guide portion extending at least along nearly an entire longitudinal length of the cup holder, and wherein the combination button and guide is an integrally molded component movably secured to the cup holder body for lateral movement relative to the cup holder body.

15. The assembly of claim 14 wherein the associated console structure has laterally spaced apart walls defining a storage compartment, the laterally spaced apart walls having recessed tracks defined therein, and wherein said elongated guide portion is removably received in one of the recessed tracks to enable sliding movement of the cup holder body and the combination button and guide is urged into said one of the recessed tracks by a biasing device, the guide portion of the combination button and guide fully removable from said one of the recessed tracks by application of a manual force on the button portion thereby enabling the cup holder to be removed from the console structure.

16. The assembly of claim 14 wherein the elongated guide portion is elongated so as to be coextensive or nearly coextensive with a longitudinal length of the cup holder body, the button portion disposed centrally along the guide portion and spaced apart from longitudinal ends of the guide portion.

17. In a console assembly for a vehicle that defines a storage compartment with lateral walls thereof defining recessed tracks, a cup holder comprising:
a cup holder body slidably and removably mounted to the console structure within the storage compartment, the cup holder body slideable between a forward position disposed adjacent a front wall of the console structure and a rearward position disposed adjacent a rearward wall of the console structure;
guide portions of the cup holder body removably received in the recessed tracks for guiding sliding movement of the cup holder between the forward position and the rearward position; and
a finger recess portion integrally molded with one of the guide portions for manipulating said one of the guide portions or the cup holder body,
wherein said one of the guide portions is a spring-biased guide portion urged by a spring into a corresponding one of the recessed tracks, and wherein the finger recess portion is integrally molded with the spring-biased guide portion to receive application of manual force overcoming the urging of the spring-biased guide portion to remove the spring-biased guide portion from said corresponding one of the recessed tracks.

18. The assembly of claim 17 wherein the guide portion is elongated so as to be coextensive or nearly coextensive with a longitudinal length of the cup holder body, the finger recess portion disposed centrally along the guide portion and spaced apart from longitudinal ends of the guide portion.

* * * * *